No. 777,760.

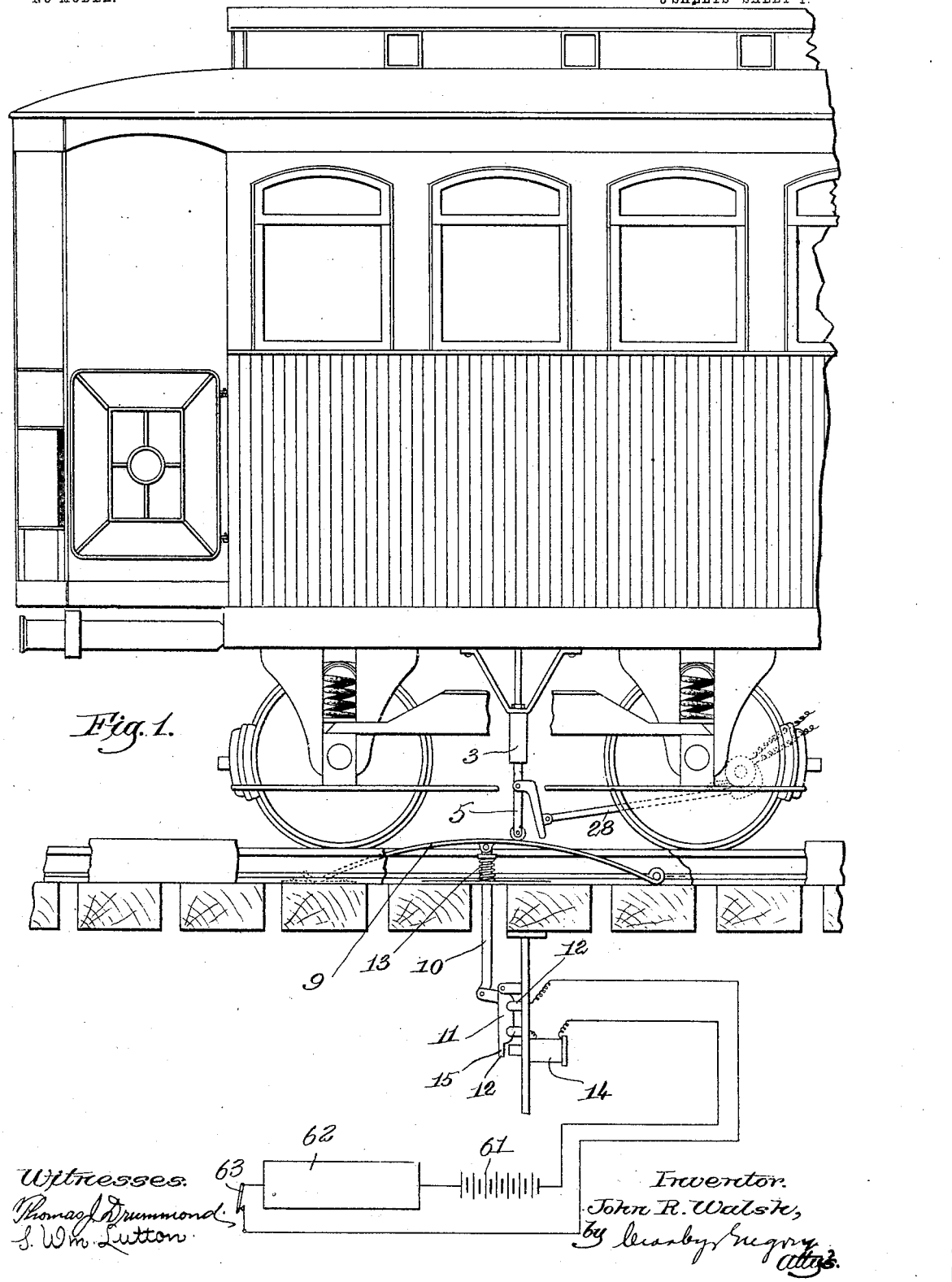

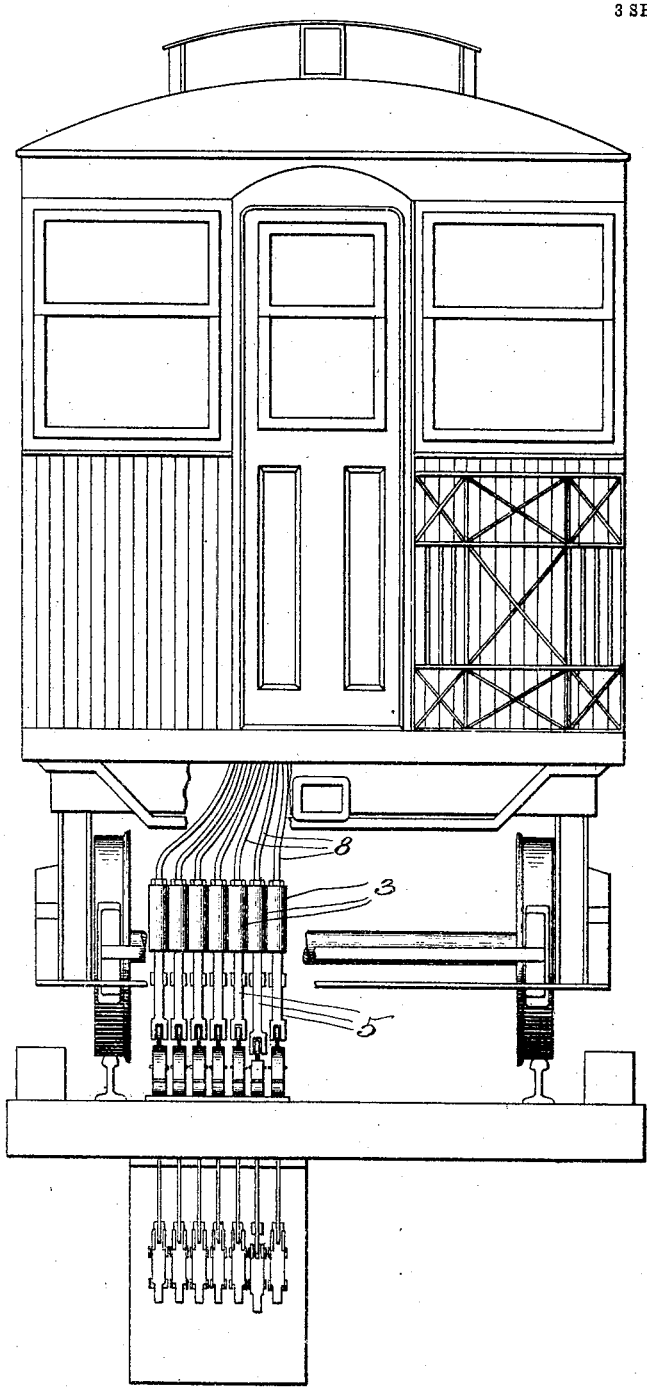

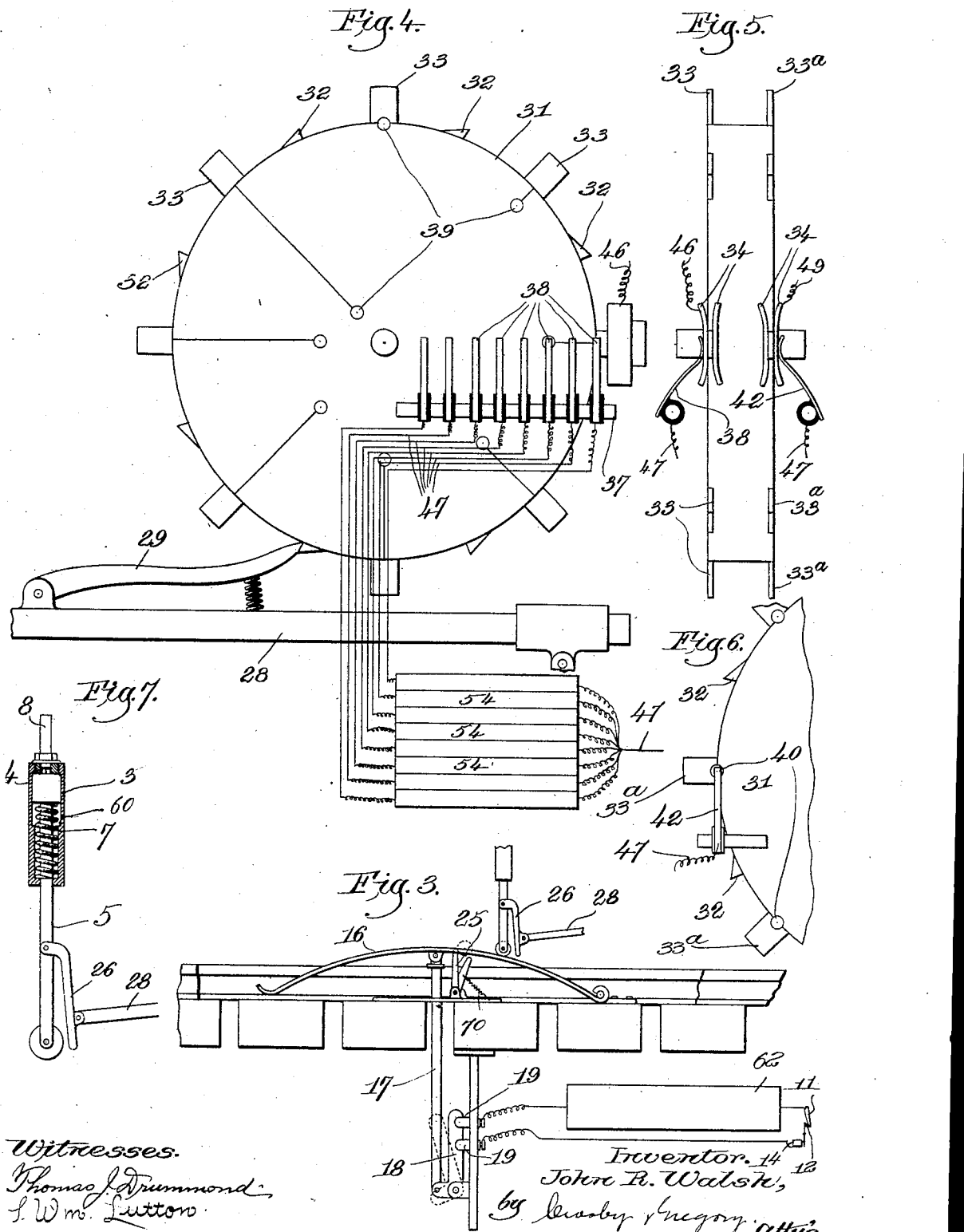

Patented December 20, 1904.

UNITED STATES PATENT OFFICE.

JOHN R. WALSH, OF BOSTON, MASSACHUSETTS, ASSIGNOR OF ONE-HALF TO HENRY T. GOOLD, OF LEXINGTON, MASSACHUSETTS.

AUTOMATIC SIGNAL SYSTEM.

SPECIFICATION forming part of Letters Patent No. 777,760, dated December 20, 1904.

Application filed February 19, 1904. Serial No. 194,335.

*To all whom it may concern:*

Be it known that I, JOHN R. WALSH, a citizen of the United States, residing at Boston, in the county of Suffolk and State of Massachusetts, have invented an Improvement in Automatic Signal Systems, of which the following description, in connection with the accompanying drawings, is a specification, like numerals on the drawings representing like parts.

This invention has for its object to provide an automatic signal system which is intended for use where a number of cars traversing different routes enter and leave a central station; and it has for its object to provide a mechanism by means of which the particular route over which each car is to go can be automatically announced in the station by said car as it approaches the station and the stations along the route can be automatically announced in the car after said car has left the central station. The device is therefore a combined route and station indicator.

The device comprises a plurality of tappets carried by each car, there being as many tappets as there are different routes over which the cars from the central station travel, and circuit-closing devices, certain of which are located along the track at the proper distance and are connected to an annunciator in the central station and others of which are carried by the car and are connected to an annunciator in said car. The circuit-closing devices have such a relation to the various tappets that when the tappet corresponding to any particular route is depressed by the engineer or motorman said tappet coöperates with the proper circuit-closing device, so that the route corresponding to the said depressed tappet is announced in the central station before the car arrives there, and after the car has left said station said depressed tappet coöperates with other circuit-closing devices to announce automatically the various stations along the route in the car.

In the drawings accompanying this application, Figure 1 is a side view of a car having my improved tappets thereon, said view showing one of the circuit-closing devices. Fig. 2 is a front view of Fig. 1. Fig. 3 is a view showing a circuit-opening device. Figs. 4, 5, and 6 are details of the circuit-closing devices controlling the station-annunciator in the car. Fig. 7 is an enlarged view of one of the plungers or tappets.

My improved device can be applied to electric cars, steam-cars, horse-cars, or any other kind of cars.

The tappets may be of any suitable shape adapted to depress and operate the circuit-closers hereinafter described. Those herein shown comprise cylinders 3, suitably secured to the car-body and in which operate pistons or plungers 4, having the projecting stems 5, which are adapted to engage the circuit-closing devices presently to be described. It is my purpose to employ as many of these tappets as there are various routes over which the cars from the central station travel. In the illustration of my invention shown in the drawings there are seven of such tappets, as seen in Fig. 2, and each one represents a different route. Each plunger or piston 4 is held elevated or in its inoperative position by means of a suitable spring 7 and is depressed at the proper time in any suitable way. Herein I have illustrated each plunger as adapted to be depressed by admitting compressed air or other motive fluid to the cylinder, and for this purpose each cylinder has secured to its end a pipe 8, leading to suitable valve mechanism (not shown) within convenient reach of the engineer or motorman, whereby the latter may admit air to any one of the cylinders. The admission of air to any of the cylinders depresses the plunger therein and carries it into its operative position, as shown by the second plunger from the left, Fig. 2, the plunger when in this position operating the various circuit-closing and circuit-opening devices. In order to prevent the leakage of air around the plunger, and thereby the gradual raising of said plunger, I prefer to make the cylinder 3 with the shoulder 60, against which the piston seats when it is depressed, this shoulder forming a valve to prevent the leakage of air around the piston and also serving as a stop to limit its downward movement.

Situated some distance from the central station and along the track leading thereto is a series of circuit-closing devices, such as shown in Fig. 1, there preferably being one of such circuit-closing devices for each of the tappets. Each circuit-closing device is in a separate circuit, and said circuit extends to an annunciator in the central station. I preferably will use electric signs for indicating the route, and each one of the circuits will include one of said signs. Each circuit-closing device illustrated comprises a spring member 9, situated to be engaged by the depressed plunger and having connected thereto a stem 10, which is hinged to a switch-blade 11, which when closed is adapted to engage the switch-contacts 12. The stem is normally held elevated by a suitable spring 13, and when elevated the switch is open. The circuit includes the coils of a suitable magnet 14, and the switch-blade 11 has an extension 15, which constitutes an armature for said magnet. When the stem 10 is depressed by the tappet and the switch-blade 11 closed, as shown in Fig. 1, the corresponding circuit will be closed and the sign in said circuit displayed in the station indicating the route. The closing of the circuit energizes the magnet 14, and the latter maintains the switch closed so long as the circuit is closed.

In Fig. 1 I have illustrated diagrammatically the circuit corresponding to the switch-closing device shown in said figure, from which it will be seen that it includes the contacts 12, coils of the magnet 14, a suitable battery or source of electrical supply 61, a sign 62 in the main or central station, and a circuit-opening device 63, which will be hereinafter described. In said Fig. 1 I have illustrated the circuit-opening device diagrammatically merely.

As above stated, it is my intention to place the circuit-closing devices, such as shown in Fig. 1, at some point where they will be operated by the car some time prior to its entrance to the main station, so that the route which the incoming car is to take will be announced before said car enters the station. After the car leaves the station it engages a circuit-opening device 63, which opens the circuit, and thereby throws off the sign in the station. Said circuit-opening device is shown in Fig. 3 and comprises a spring member 16, having a plunger 17 depending therefrom and pivoted to a switch-blade 18, which normally spans the contacts 19 in the circuit. The manner of pivoting the switch-blade is such that the depression of the switch member opens the switch. As soon as the switch is opened and the circuit broken the magnet 14 becomes deënergized and the spring 13 then opens the switch-blade 11. The spring member 16 causes the switch-blade 18 to close onto the contacts 19 as soon as the tappet has passed over said member, and said switch, therefore, is normally closed.

In Fig. 3 I have illustrated again diagrammatically the circuit which includes the contacts 19 and switch-opening device, said circuit including the sign 62 and the switch-closing device 11 12 and the magnet 14.

The parts thus far described operate as follows: If the car about to enter the station is to proceed over route No. 2, the engineer or motorman will depress tappet No. 2 and allow it to remain depressed throughout the entire route. Said tappet by its engagement with the corresponding switch-closing device closes the circuit No. 2, and thus the route which the car is to take is exhibited in the central station, said circuit remaining closed, as above described, until the car has left the station and reaches the circuit-opening device. At this time the circuit is opened by the circuit-opening device and the sign in the station thrown off. Situated at appropriate intervals along the route are pivoted members 25, which are adapted to engage a hinged finger 26, carried by the lowered tappet. The impact of the members 25 against the finger swings the latter backwardly, and thereby gives movement to a rod 28, carrying a pawl 29. Said pawl by its engagement with the circuit-closing devices on the car operates to close the appropriate circuit to indicate in the car the name of the next station.

The circuit-closing devices carried by the car are preferably constructed as follows: 31 indicates a rotative member having the ratchet-teeth 32 thereon which are adapted to be engaged by the pawl 29. Said member has on its periphery two series of contacts 33 33$^a$, which are adapted to pass between stationary contacts 34. At one side of said member is a rod or support 37, carrying a series of contact-fingers 38, there being as many such contact-fingers as there are stations to be indicated on the route. Situated in one side of the rotative member are a series of corresponding contacts 39, arranged at different radial distances from the center, each contact 39 being so spaced as to be brought into engagement at the appropriate time with the corresponding finger-contact 38. The contacts 39 are electrically connected with the various fingers 33, as shown in Fig. 4. On the other side of the member 31 are a series of contacts 40 of the same number as the series 39, each contact being electrically connected with the corresponding finger or contact 33$^a$. A fixed contact-finger 42 is placed so as to be engaged by the successive contacts 40, the latter being arranged at the same radial distance from the center of rotation, as shown in Fig. 6. A wire 46 extends from the contact 34 to the source of electrical supply, whether a battery or trolley-wire. A wire 47 extends from each of the contact-fingers 38, which are suitably insulated from the support 37 to the sign-board in the car and from said sign-board to the contact-finger 42, which also is properly insulated from its support. Another wire 49 extends from the other pair of contacts 34 back to the source of electrical energy. Each of the wires 47 leads to and includes a different sign 54 in the car, said signs indicating the various stations or stops along the route. In the form of the invention illustrated there are eight such stations and stops, and consequently eight contacts 39, eight contact-fingers 38, and eight different wires 47, including the eight different signs 54 in the car. The pivoted members 25 are placed along the route, one just before each station, and each time the car passes over one of these fingers the depressed tappet will engage it, and thereby advance the rotative member 31 one step. When the car leaves the central station, said rotative member will be so set that its contact 39 corresponding to the first stop under the corresponding finger 38 and the corresponding contacts 33 33$^a$ are between the contacts 34. When this occurs, a circuit is closed through the wire 47, including the sign denoting the first stop, and said sign is displayed. Just after the first station has been passed the tappet engages another member 25 and the rotative member 31 is advanced another step, thereby closing the contact through the next wire 47 and displaying another sign which denotes the next stop. This operation is repeated throughout the route, and as there will be as many contacts and separate circuits as there are stops to be made the member 25 will have been rotated just once while the car is traveling over the route. As the car approaches the central station the engineer or motorman allows the depressed tappet to be raised and depresses the tappet corresponding to the route which he is to take in his second trip, and the same operations as above described are again repeated.

It will be understood that there are as many of the circuit-closing devices shown in Figs. 4, 5, and 6 as there are tappets, so that when any tappet is depressed the stations or stops along the route will be properly indicated in the car.

The first pivot member 25 is preferably associated with the circuit-opening device, and the successive members will be used in conjunction with a spring member similar to 16. In the preferred embodiment of my invention the member 25 comprises two arms rigidly connected, one of which is adapted to be struck by the depressed tappet, as shown by dotted lines in Fig. 3, and the other of which is adapted to engage the fingers 26 as said member turns. In operation the depressed plunger strikes the longer arm of the member 25 and rocks the arm about its pivot, this action operating to throw up the shorter arm just behind the plunger and in front of the arm 26, this shorter arm catching the arm 26 and giving the requisite backward movement to the rod 28. After the tappet has passed over the member 25 the spring 70 serves to return it to its normal position.

Having described my invention, what I claim as new, and desire to secure by Letters Patent, is—

1. In a signal system, a plurality of circuits each including a sign in a central station, a circuit-closer, and a circuit-opener, combined with a tappet on a car to engage successively the circuit-closer and the circuit-opener in any one circuit.

2. In a signal system, a plurality of circuits each including a sign, a circuit-closer and a circuit-opener, combined with a car having a plurality of tappets thereon, and means to depress the tappet corresponding to any circuit.

3. In a signal system, a circuit including a visual route-indicating sign, a normally open circuit-closer and a normally closed circuit-opener, combined with a tappet on a moving car to engage successively said circuit-closer and circuit-opener.

4. In a signal system, a circuit including a visual route-indicating sign, a circuit-closer, a circuit-opener, and a magnet to coöperate with the circuit-closer to hold the circuit closed until the circuit-opener is operated, combined with a tappet on a moving car to engage successively the circuit-closer and the circuit-opener.

5. In a signal system, a plurality of circuits each including a sign, a normally open circuit-closer, and a normally closed circuit-opener, combined with a car having a corresponding number of tappets, and means to depress any desired tappet, the depressed tappet coöperating with the corresponding circuit-closer and the circuit-opener to close and open successively the corresponding circuit.

6. In a signal system, a plurality of circuits each including a sign, a circuit-closer, a circuit-opener and a magnet to coöperate with the circuit-closer to hold the circuit closed until the circuit-opener is operated, combined with a corresponding number of tappets carried by a moving car, and means to depress any tappet, the depressed tappet corresponding with the corresponding circuit-closer and circuit-opener to close and open successively the corresponding circuit.

7. In a signal system, a plurality of circuits each including a route-indicating sign, a circuit-closer and a circuit-opener, combined with a tappet on a moving car to engage successively the circuit-closer and circuit-opener in any circuit, and a plurality of circuits on the car, each including a station-indicating sign, a series of actuators along the route of the car, and means connected with said tappet to engage said actuators and thereby close the various circuits on the car successively.

8. In a signal system, a plurality of circuits each including a route-indicating sign, a circuit-closer and a circuit-opener, combined with a corresponding number of tappets on a moving car, means to depress any one tappet to cause the same to coöperate with the corresponding circuit-closer and circuit-opener, a second series of circuits on the car each including a station-indicating sign, actuators along the route of the car, and means connected with each tappet to engage the successive actuators and close the various circuits on the car respectively.

9. In a signal system, a series of circuits on a car, each including a station-indicating sign, a circuit-closer, a series of actuators along the route of the car, and means operated by the successive actuators to close the circuits on the car successively.

10. In a signal system, a circuit including a sign, a circuit-closer comprising a spring member adapted to be engaged by a tappet on a moving car, a plunger depending from said member, a pivoted switch-blade connected to the plunger, and contacts against which said blade is closed when the plunger is depressed, combined with a magnet in said circuit coöperating with said blade to hold the latter closed.

11. In a signal system, a circuit including a sign, a circuit-closer and a circuit-opener, said circuit-closer comprising a spring member adapted to be engaged by a tappet on a moving car, a pivoted switch-blade connected to said member and contacts against which said blade is closed, combined with a magnet in said circuit coöperating with said blade to hold the latter closed, and said circuit-opener comprising two contacts, a switch-blade normally spanning said contact, and a spring member adapted to be connected to said plate and adapted to be actuated by the tappet.

12. In a signal system, a plurality of circuits on the car each including a sign, a circuit-closer comprising a rotative member having a contact for each circuit, a fixed contact-finger coöperating with said contact, and means to advance the rotative member at predetermined intervals.

13. In a signal system, a plurality of circuits on the car each including a sign, a circuit-closer comprising a rotative member having a contact for each circuit, a fixed contact-finger coöperating with said contact, a plurality of actuators along the route of the car, a tappet on the car, and means to depress said tappet to bring it into position to engage said actuators, and connections between said tappet and the rotative member whereby the latter is advanced one step each time the tappet engages an actuator.

In testimony whereof I have signed my name to this specification in the presence of two subscribing witnesses.

JOHN R. WALSH.

Witnesses:
   LOUIS C. SMITH,
   JOHN C. EDWARDS.